United States Patent
Sultan et al.

(10) Patent No.: US 7,881,192 B2
(45) Date of Patent: Feb. 1, 2011

(54) SYSTEM FOR PROVIDING AGGREGATE-RATE COMMUNICATION SERVICES

(75) Inventors: Robert Sultan, Somers, NY (US); Linda Dunbar, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 1004 days.

(21) Appl. No.: 11/622,536

(22) Filed: Jan. 12, 2007

(65) Prior Publication Data

US 2007/0165626 A1    Jul. 19, 2007

Related U.S. Application Data

(60) Provisional application No. 60/758,870, filed on Jan. 13, 2006, provisional application No. 60/820,202, filed on Jul. 24, 2006.

(51) Int. Cl.
H04L 12/28 (2006.01)
(52) U.S. Cl. .................................. 370/230; 370/254
(58) Field of Classification Search ................ 370/230, 370/401, 408, 412, 252, 256
See application file for complete search history.

(56) References Cited

U.S. PATENT DOCUMENTS

| | | | |
|---|---|---|---|
| 4,827,477 A | 5/1989 | Avaneas | |
| 5,535,193 A | 7/1996 | Zhang et al. | |
| 5,748,901 A | 5/1998 | Afek et al. | |
| 5,857,147 A | 1/1999 | Gardner et al. | |
| 5,914,945 A * | 6/1999 | Abu-Amara et al. | 370/329 |
| 6,341,134 B1 | 1/2002 | Toutain et al. | |
| 6,515,969 B1 * | 2/2003 | Smith | 370/256 |
| 6,665,733 B1 * | 12/2003 | Witkowski et al. | 709/249 |
| 6,850,540 B1 | 2/2005 | Peisa et al. | |
| 7,072,295 B1 | 7/2006 | Benson et al. | |
| 7,102,997 B2 | 9/2006 | Sultan et al. | |
| 7,355,969 B2 * | 4/2008 | Champlin et al. | 370/230 |
| 7,372,814 B1 | 5/2008 | Chiruvolu et al. | |
| 7,515,535 B2 * | 4/2009 | Finn | 370/230 |
| 2002/0085559 A1 | 7/2002 | Gibson et al. | |
| 2003/0097461 A1 | 5/2003 | Barham et al. | |
| 2003/0133415 A1 | 7/2003 | Kim et al. | |

(Continued)

FOREIGN PATENT DOCUMENTS

CN      1426651 A      6/2003

(Continued)

OTHER PUBLICATIONS

Newton, Harry. Newton's Telecom Dictionary. Feb. 2006. CMP Books. 22nd Ed. p. 1009. p. 733.*

(Continued)

Primary Examiner—Ricky Ngo
Assistant Examiner—Ben H Liu
(74) Attorney, Agent, or Firm—Conley Rose, P.C.; Grant Rodolph (57) ABSTRACT

A system for providing aggregate-rate communication services is provided. The system comprises a provider network, having an arbitrary topology; a plurality of customers; and a plurality of port nodes, comprising at least one aggregation-group. Port nodes in the at least one aggregation-group share capacity of the at least one aggregation-group fairly. Each of the plurality of customers is associated with at least one of the plurality of port nodes to access the provider network.

38 Claims, 5 Drawing Sheets

U.S. PATENT DOCUMENTS

| | | | |
|---|---|---|---|
| 2003/0163593 | A1 | 8/2003 | Knightly |
| 2003/0165146 | A1 | 9/2003 | Sultan et al. |
| 2003/0172362 | A1 | 9/2003 | Mack-Crane et al. |
| 2003/0227926 | A1 | 12/2003 | Ramamurthy et al. |
| 2005/0044272 | A1 | 2/2005 | Uzun et al. |
| 2005/0073952 | A1* | 4/2005 | Champlin et al. ............ 370/229 |
| 2005/0213558 | A1 | 9/2005 | Levit et al. |
| 2005/0262264 | A1 | 11/2005 | Ando et al. |
| 2006/0018313 | A1 | 1/2006 | Oki et al. |
| 2006/0098672 | A1 | 5/2006 | Schzukin et al. |
| 2006/0176900 | A1 | 8/2006 | Liu et al. |
| 2007/0143490 | A1 | 6/2007 | Gallou et al. |
| 2007/0165527 | A1 | 7/2007 | Sultan et al. |
| 2007/0165627 | A1 | 7/2007 | Sultan et al. |
| 2007/0263640 | A1* | 11/2007 | Finn ........................... 370/401 |

FOREIGN PATENT DOCUMENTS

| | | |
|---|---|---|
| CN | 1534926 A | 10/2004 |
| CN | 1585504 A | 2/2005 |
| CN | 1614944 A | 5/2005 |
| CN | 1780347 A | 5/2006 |
| CN | 1897492 A | 1/2007 |
| EP | 1460808 A2 | 4/2010 |
| GB | 2342825 A | 4/2000 |
| WO | 2005013513 A1 | 2/2005 |

OTHER PUBLICATIONS

Duffield, Nick, et al., "A Performance Oriented Service Interface for Virtual Private Networks," Internet Engineering Task Force, Internet Draft, draft-duffield-vpn-qos-framework-00.txt, 28 pgs.

Foreign Communication From a Related Counterpart Application—European Supplementary Search Report, EP 07764275.9, May 26, 2009, 7 pages.

Foreign Communication From a Related Counterpart Application—International Search Report and Written Opinion, PCT/CN2007/070351, Nov. 1, 2007, 8 pages.

Metro Ethernet Forum, Technical Specification, D00044_004, "Ethernet Services Attributes—Phase 2—Approved Draft 4," dated Aug. 27, 2006, 17 pages, The Metro Ethernet Forum 2005.

Metro Ethernet Forum, Technical Specification, D00044_006, "Ethernet Services Attributes—Phase 2—Aprpoved Draft 6," dated Jul. 27, 2006, 69 pages, The Metro Ethernet Forum 2005.

IEEE Computer Society, IEEE Standard for Local and Metropolitan Area Networks, "Virtual Bridged Local Area Networks, Amendment 4: Provider Bridges," IEEE Std 802.1ad™, May 26, 2006, 74 pages.

IEEE, Information Technology- Telecommunications and Information Exchange Between Systems- Local and Metropolitan Area Networks- Specific Requirements, "Part 3: Carrier Sense Multiple Access With Collision Detection (CSMA/CD) Access Method and Physical Layer Specifications," IEEE Std 802.3™, 2005, 100 pages (1-100).

IEEE, Information Technology- Telecommunications and Information Exchange Between Systems- Local and Metropolitan Area Networks- Specific Requirements, "Part 3: Carrier Sense Multiple Access With Collision Detection (CSMA/CD) Access Method and Physical Layer Specifications," IEEE Std 802.3™, 2005, 100 pages (101-200).

IEEE, Information Technology- Telecommunications and Information Exchange Between Systems- Local and Metropolitan Area Networks- Specific Requirements, "Part 3: Carrier Sense Multiple Access With Collision Detection (CSMA/CD) Access Method and Physical Layer Specifications," IEEE Std 802.3™, 2005, 100 pages (201-303).

IEEE, Information Technology- Telecommunications and Information Exchange Between Systems- Local and Metropolitan Area Networks- Specific Requirements, "Part 3: Carrier Sense Multiple Access With Collision Detection (CSMA/CD) Access Method and Physical Layer Specifications," IEEE Std 802.3™, 2005, 87 pages (301-387).

IEEE Computer Society, IEEE Standard for Information Technology- Telecommunications and Information Exchange Between Systems- Local and Metropolitan Area Networks- Specific Requirements, "Part 17: Resilient Packet Ring (RPR) Access Method and Physical Layer Specifications," IEEE Std 802.17™, Sep. 24, 2004, 100 pages (25 cover pages + 1-75).

IEEE Computer Society, IEEE Standard for Information Technology- Telecommunications and Information Exchange Between Systems- Local and Metropolitan Area Networks- Specific Requirements, "Part 17: Resilient Packet Ring (RPR) Access Method and Physical Layer Specifications," IEEE Std 802.17™, Sep. 24, 2004, 100 pages (76-175).

IEEE Computer Society, IEEE Standard for Information Technology- Telecommunications and Information Exchange Between Systems- Local and Metropolitan Area Networks- Specific Requirements, "Part 17: Resilient Packet Ring (RPR) Access Method and Physical Layer Specifications," IEEE Std 802.17™, Sep. 24, 2004, 100 pages (176-275).

IEEE Computer Society, IEEE Standard for Information Technology- Telecommunications and Information Exchange Between Systems- Local and Metropolitan Area Networks- Specific Requirements, "Part 17: Resilient Packet Ring (RPR) Access Method and Physical Layer Specifications," IEEE Std 802.17™, Sep. 24, 2004, 100 pages (276-373).

IEEE Computer Society, IEEE Standard for Information Technology- Telecommunications and Information Exchange Between Systems- Local and Metropolitan Area Networks- Specific Requirements, "Part 17: Resilient Packet Ring (RPR) Access Method and Physical Layer Specifications," IEEE Std 802.17™, Sep. 24, 2004, 100 pages (374-473).

IEEE Computer Society, IEEE Standard for Information Technology- Telecommunications and Information Exchange Between Systems- Local and Metropolitan Area Networks- Specific Requirements, "Part 17: Resilient Packet Ring (RPR) Access Method and Physical Layer Specifications," IEEE Std 802.17™, Sep. 24, 2004, 100 pages (474-573).

IEEE Computer Society, IEEE Standard for Information Technology- Telecommunications and Information Exchange Between Systems- Local and Metropolitan Area Networks- Specific Requirements, "Part 17: Resilient Packet Ring (RPR) Access Method and Physical Layer Specifications," IEEE Std 802.17™, Sep. 24, 2004, 91 pages (574-664).

Foreign Communication from a Counterpart Application—European application No. 07764275.9—European Office action dated Nov. 12, 2009, 3 pages.

Office Action dated Jun. 23, 2009, U.S. Appl. No. 11/622,646, filed Jan. 12, 2007, 29 pages.

Office Action dated Feb. 16, 2010, U.S. Appl. No. 11/622,646, filed Jan. 12, 2007, 29 pages.

Office Action dated Jul. 20, 2009, U.S. Appl. No. 11/622,744, filed Jan. 12, 2007, 54 pages.

Office Action dated Feb. 23, 2010, U.S. Appl. No. 11/622,744, filed Jan. 12, 2007, 21 pages.

Foreign Communication From a Related Counterpart Application—European Supplementary Search Report, EP 07785378.6, Nov. 3, 2008, 8 pages.

Foreign Communication From a Related Counterpart Application—International Search Report and Written Opinion, PCT/CN2007/070350, Sep. 27, 2007, 7 pages.

Foreign Communication From a Related Counterpart Application—Supplementary European Search Report, EP 07785404.0, Nov. 28, 2008, 12 pages.

Foreign Communication From a Related Counterpart Application—International Search Report and Written Opinion, PCT/CN2007/070348, Nov. 8, 2007, 12 pages.

Foreign communication from a related counterpart application—European Office Action—EP 07764275.9, Nov. 12, 2009, 3 pages.

Office Action dated Jul. 14, 2010, U.S. Appl. No. 11/622,646, filed Jan. 12, 2007, 38 pages.

Notice of Allowance dated Aug. 30, 2010, U.S. Appl. No. 11/622,646, filed Jan. 12, 2007, 9 pages.

Office Action dated Jan. 4, 2010, U.S. Appl. No. 11/622,744, filed Jan. 12, 2007, 15 pages.
Office Action dated Jul. 20, 2010, U.S. Appl. No. 11/622,744, filed Jan. 12, 2007, 16 pages.

Notice of Allowance dated Sep. 1, 2010, U.S. Appl. No. 11/622,744, filed Jan. 12, 2007, 10 pages.

* cited by examiner

SYSTEM FOR PROVIDING AGGREGATE-RATE COMMUNICATION SERVICES

PRIORITY CLAIM

This application claims the priority of: U.S. Provisional Application No. 60/758,870, filed on Jan. 13, 2006, "METHOD OF RATE CONTROL FOR AN ETHERNET VIRTUAL SHARED MEDIUM" by Robert Sultan; and U.S. Provisional Application No. 60/820,202, filed on Jul. 24, 2006, "SYSTEM AND METHOD OF RATE-CONTROL FOR AN ETHERNET VIRTUAL SHARED MEDIUM" by Robert Sultan, Stein Gjessing, Xuan Zhang, Zhushen Deng, Linda Dunbar, Lucy Yong, Jianfei He, and Xixiang Li.

CROSS-REFERENCE TO RELATED APPLICATIONS

This application is related to: U.S. application Ser. No. 11/622,646, filed concurrently with the present application on Jan. 12, 2007, "SYSTEM FOR RATE-CONTROL OF AGGREGATE-RATE COMMUNICATION SERVICES", by Robert Sultan, Stein Gjessing, Xuan Zhang, Zhusheng Deng, Xixiang Li, and Jianfei He; and U.S. application Ser. No. 11/622,744, filed concurrently with the present application on Jan. 12, 2007, "SYSTEM FOR RATE MANAGEMENT OF AGGREGATE-RATE COMMUNICATION SERVICES", by Robert Sultan, Linda Dunbar, and Lucy Yong.

TECHNICAL FIELD OF THE INVENTION

The present invention relates generally to network communications, and more particularly, to a versatile system for providing aggregate-rate communication services in a network of an arbitrary topology.

BACKGROUND OF THE INVENTION

Ethernet is one of the most widely-installed Local Area Network (LAN) technologies. Users are attracted by a number of advantages of Ethernet services, including ease of use, cost effectiveness, flexibility, and wide rage of service options. Ethernet services have been extended throughout metropolitan areas and beyond.

Ethernet services may vary in many ways. The Metropolitan Ethernet Forum (MEF) defines two types of Ethernet services: E-Line services, which are point-to-point services; and E-LAN services, which are multipoint services. MEF specifies distinct layer-1 and layer-2 E-LAN services. A layer-1 E-LAN service is called an Ethernet LAN (ELAN) service, and a layer-2 E-LAN service is called an Ethernet Virtual LAN (EVLAN) service. The EVLAN allows users to exchange frames as if connected to a shared medium LAN.

Two methods currently used to specify rate guarantees for EVLAN services are port-to-port guarantee and per-port guarantee. Port-to-port guarantee specifies a distinct bandwidth guaranteed for traffic from a specific port to another specific port. This is a traditional guarantee provided in frame relay and private-line services. This method may be more efficient when port-to-port traffic rate is relatively constant.

Per-port guarantee specifies distinct bandwidth guaranteed for traffic originating from each port, without regard to destination ports. This type of guarantee is relatively easy to police as only knowledge of local port ingress traffic is required. A service provider needs to, however, support a case in which every user is sending at a full ingress rate.

A technology known as an Ethernet Bus (or Carrier Sense Multiple Access/Collision Detection—CSMA/CD, or Shared Medium Ethernet) provides services similar to an aggregate-rate guarantee. An Ethernet Bus has the ability to share the capacity of a network among user ports, with some inefficiency introduced by methods of mediation among the ports. However, the Ethernet Bus may not be applied to networks of arbitrary technology, and the specified aggregate-rate may not have an arbitrary value.

U.S. patent application No. 20030165146 describes how the capacity of a network having a ring topology may be shared among users, such that each instance of service appears to its users as a private network, whose capacity is shared fairly among its users. However, this method is not applicable to a network of an arbitrary topology.

The IEEE P802.1ad Draft Standard for Local and Metropolitan Area Networks—Virtual Bridged Local Area Networks—Amendment 4: Provider Bridges, describes how a network of arbitrary topology may be partitioned into distinct instances of a Service Virtual LAN (SVLAN). However, the method of IEEE P802.1ad does not explicitly support aggregate-rate services or fair sharing of network capacity among members of a group of users.

The IEEE P802.17 Standard for Information Technology—Telecommunications and information exchange between systems—Local and metropolitan area networks—Specific requirements—Part 17: Resilient Packet Ring (RPR) access method and physical layer specifications, describes how the capacity of a network having a ring topology may be shared fairly among its users. However, the method of IEEE P802.17 only supports the fair sharing of capacity in a network having a ring topology, and is not applicable for a network of arbitrary topology.

The Metropolitan Ethernet Forum—Technical Specification D00044_004 Ethernet Services Attributes—Phase 2—Approved Draft 4, 14 Nov. 2005, describes how capacity may be associated with a user port, or with a virtual connection between or among user ports. However, the Metro Ethernet Forum method does not explicitly support aggregate-rate services or fair sharing of capacity among members of a group of user ports associated with a virtual connection.

Therefore, there is a need for a system that provides flexible and cost effective rate guarantee services in a communications network; an aggregate-rate guarantee, with sharing of aggregate capacity fairly among members of a group of customer ports, and applicable to a network of an arbitrary topology; aggregate-rate services that accommodate bursty network traffic in an efficient and cost effective manner.

SUMMARY OF THE INVENTION

The present invention discloses a system for providing aggregate-rate communication services. The system comprises a provider network, having an arbitrary topology; a plurality of customers; and a plurality of port nodes, comprising at least one aggregation-group; wherein port nodes of the at least one aggregation-group share capacity associated with the at least one aggregation-group fairly. Each of the plurality of customers is associated with at least one of the plurality of port node to access the provider network.

One aggregation-group comprises a group of port nodes sharing fairly a guaranteed-rate. The guaranteed-rate may be requested or purchased by a customer, and provisioned by a service provider. A customer may be associated with multiple aggregation-groups. A customer may also be associated with a port node that does not belong to an aggregation-group.

The system in the present invention provides a registration and deregistration mechanism to create and delete an aggregation-group in a provider network, and a mechanism for a port to join or withdraw from an aggregation-group. A performance monitoring mechanism is provided to make sure the aggregate-rate services provided by the system meet a service level agreement.

The system may be applied to enterprise Local Area Networks (LANs). The system may also be applied to any communications network that may be characterized as having multiple points of ingress, each of which has a measurable ingress rate.

The system allows a service provider to meet customer requirements for bursty, high-bandwidth connectivity, without commitment of excessively large quantities of bandwidth, and provides aggregate-rate services in a flexible and cost effective manner.

The following description and drawings set forth in detail a number of illustrative embodiments of the invention. These embodiments are indicative of but a few of the various ways in which the present invention may be implemented.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

The following discussion is presented to enable a person skilled in the art to make and use the invention. The general principles described herein may be applied to embodiments and applications other than those detailed below without departing from the spirit and scope of the present invention as defined herein. The present invention is not intended to be limited to the embodiments shown, but is to be accorded the widest scope consistent with the principles and features disclosed herein.

The following terms are used in the description of the present invention below:

Aggregation-group: The set of ports that share a guaranteed-rate.

Aggregate-rate: sum of the ingress rates of the members of an aggregation-group.

Ingress: The direction from a user of a service to a provider of the service.

Port: The interface by which a user accesses the services of a provider network. Examples are an 802.1ad Provider Edge Bridge (PEB) port or a Metropolitan Ethernet Forum (MEF) User-Network Interface (UNI).

Ramping: A method of allowed-rate assignment in which the allowed-rate is assigned a value that is larger than the current value of a measured ingress-rate.

Service Provider Network: A network offering connectivity services to customers, for example, an IEEE 802.1ad Provider Bridged Network (PBN) or an MEF Metropolitan Ethernet (MEN).

Service Instance: An instance of the connectivity service offered by a provider network. Connectivity is permitted only between ports associated with the same service instance. Examples are an IEEE 802.1ad Service Virtual Local Area Network (VLAN) or an MEF Ethernet Virtual Connection (EVC).

Notation used in the present invention is described in the following. For notational convenience, the symbol Σ represents $$\sum_{i=0}^{n}$$

unless otherwise specified. $I_{(i,t)}$ indicates the value of I associated with port i at the end of time interval t.

Other identifiers are as follows:

$A_i$ (allowed-rate): The maximum rate at which traffic from a user is admitted to a service provider network at port i of an aggregation-group. $I_i$ always $\leq A_i$. $O_i > A_i$ implies $I_i = A_i$.

B: The minimum amount by which the value of $A_i$ for the next time interval should exceed the current value of $I_i$ when ramping of allowed-rates is performed.

C (committed capacity): Capacity committed by a service provider for use by a service instance on a link within a service provider network. A capacity commitment of C ensures that a specified service guarantee is met at all times. The service provider may commit less bandwidth than C, and assume a risk that the guarantee will not be met at all times.

G (guaranteed-rate): A provisioned value such that $\Sigma I_i \geq G$ when ingress-rates have attained a steady-state.

$I_i$ (ingress-rate): Actual (measured) rate of traffic introduced by port i of an aggregation-group. The rate may be low-pass filtered or smoothed to achieve stability.

$O_i$ (offered rate): A traffic rate presented by a user to a service provider at port i of an aggregation-group.

n (number of ports): Number of ports associated with an aggregation-group.

T: A fixed time interval between broadcasts of a value of $I_i$ by port i of an aggregation-group. Re-computation of the allowed-rate is also performed on this time boundary.

Figure 1:
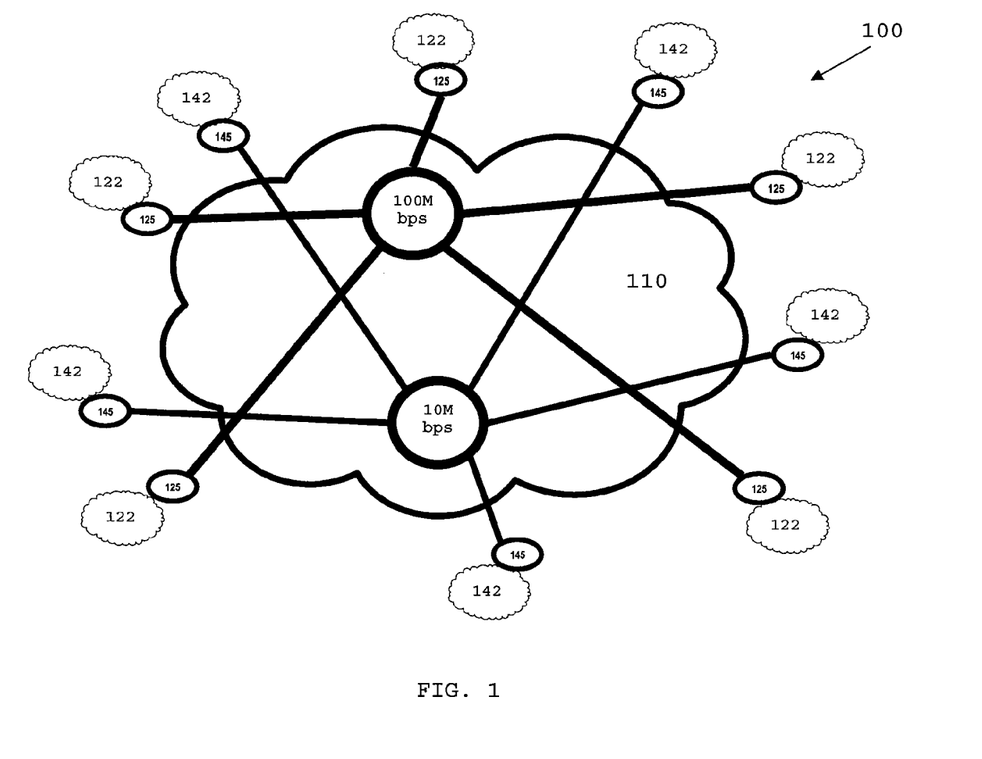
FIG. 1 illustrates an embodiment of a service provider network which provides aggregate-rate services according to the present invention.

Referring now to FIG. 1, an embodiment of an aggregate-rate service model (100) is illustrated. A service provider network (110) offers telecommunications services independently to multiple customers, i.e., a first customer (122) and a second customer (142) in FIG. 1. Traffic is introduced into service provider network (110) by ports (125) and (145). The connectivity provided to each customer is known as a Virtual Local Area Network (VLAN) or a Virtual Private Network (VPN). The network may be an Ethernet network. This example illustrates that only ports associated with the same customer may communicate. Aggregate-rate service model (100) does not require any specific network topology, that is, it may apply to a network of an arbitrary topology.

A single rate guarantee may be specified for aggregate traffic originated by a group of ports. A group of ports may include all ports associated with a customer. In FIG. 1, a guaranteed-rate 100 Mbps is specified for aggregate traffic originated from a group of ports (125), and a guaranteed-rate 10 Mbps is specified for aggregate traffic from a group of ports (145). A customer is guaranteed that, for each group of ports, the sum of ingress rates may be not less than the guaranteed-rate when offered traffic exceeds the guaranteed-rate and ingress rates have reached a steady state. A service provider need not configure a distinct capacity associated with each port or each port-pair.

As illustrated in FIG. 1, a guaranteed-rate is applied to the sum of a customer's ingress traffic. In another word, the guaranteed-rate is shared among a group of ports of a customer. For example, 10 Mbps is shared among ports (125) of customer (122). A customer, such as customer (122), may specify only a single aggregate-rate value. The aggregate-rate service model is efficient when traffic is bursty, since capacity not in use at one ingress port may be used at another port.

A guaranteed-rate may also be a provisioned value. The guaranteed-rate may be requested or purchased by a customer, and provisioned by a service provider. Thus, a service provider may commit additional capacity to ensure an effective guaranteed-rate equal to that requested by a customer. The amount of over-commitment required may vary with a value of an available parameter in a Service Level Agreement (SLA), which is a contract between a service provider and customers.

Aggregate-rate service model (100) provides fair access to aggregate capacity, where a group of ports of a customer share one guaranteed-rate. That is, a port may not have access to a larger portion of an aggregate by virtue of its physical position with respect to other ports within the group.

Customer traffic rate on any particular link in the interior of a service provider network may be controlled to be less than an aggregate-rate guaranteed for that customer. This rate control may be provided by use of rate-control algorithms/protocols. For example, a rate-control algorithm may enforce an allowed ingress rate when a customer's aggregate ingress traffic exceeds a threshold. The threshold may be a percentage of capacity committed to that customer by a service provider. A rate-control algorithm may also ensure fair access to a guaranteed-rate specified for a customer.

Figure 2:
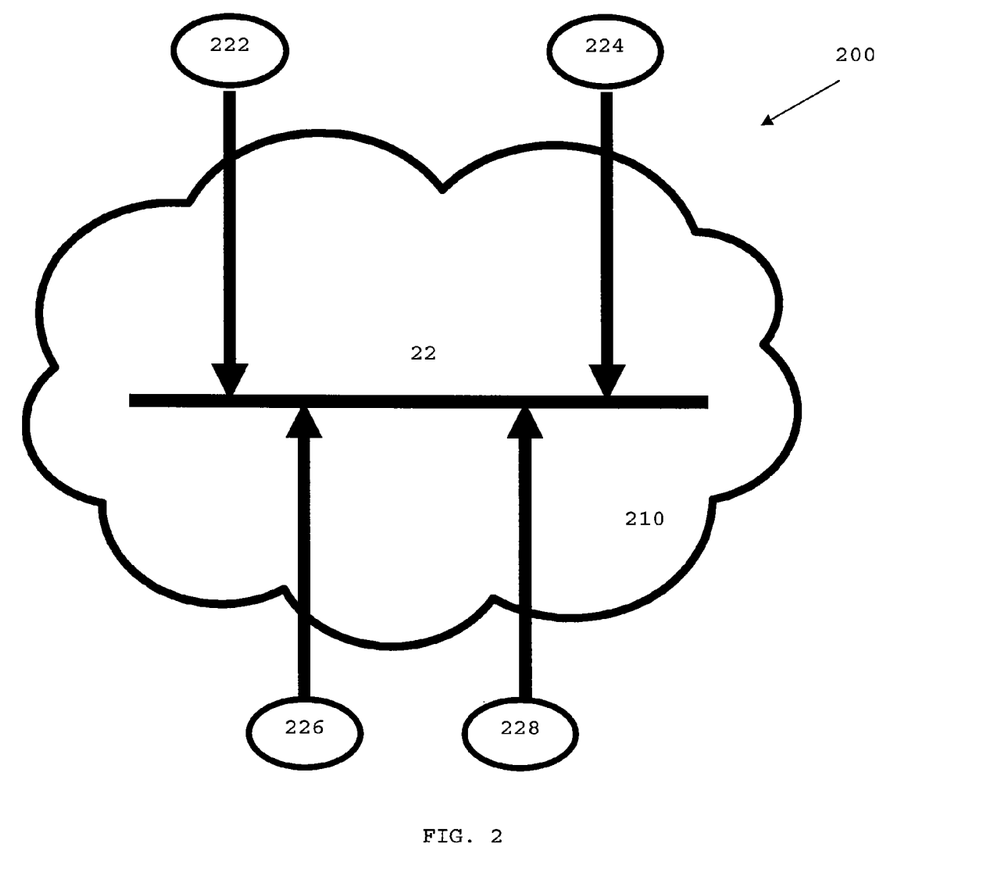
FIG. 2 illustrates an embodiment of an aggregate-rate service model according to the present invention.

A specified aggregate-rate may have an arbitrary value. In an aggregate-rate service model (200) as illustrated in FIG. 2, ports (222), (244), (226) and (228) share a guaranteed-rate 22 Mbps in a service provider network (210).

A group of ports sharing a guaranteed-rate is known as an aggregation-group. There are cases in which it is useful for customers to partition its ports into multiple aggregation-groups, each guaranteeing a specific aggregate-rate. A customer may divide the ports into several aggregation-groups, or have some individual ports that do not belong to any aggregation-group.

Figure 3:
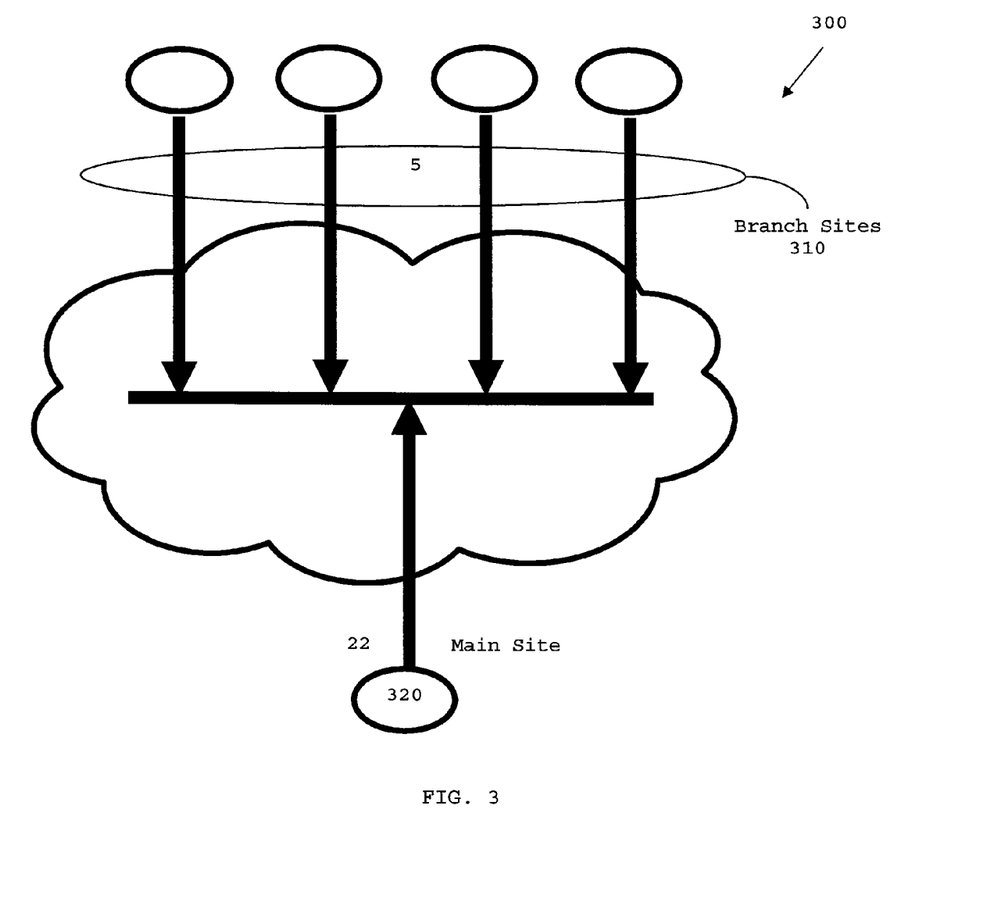
FIG. 3 illustrates an embodiment of an aggregate-rate service model according to the present invention.

FIG. 3 illustrates one embodiment of an aggregate-rate service model (300), with two aggregation-groups (310) and (320). Four branch sites in aggregation-group (310) share guaranteed-rate of 5 Mbps, while a main site (320) may send data with a rate of 22 Mbps without regard to destinations (i.e., a per-port model). This asymmetry reflects a traffic pattern that is not uncommon in customer environments. This example in FIG. 3 illustrates that an aggregation-group need not contain all the ports associated with a customer, and that a customer may mix available service models as appropriate.

Figure 4:
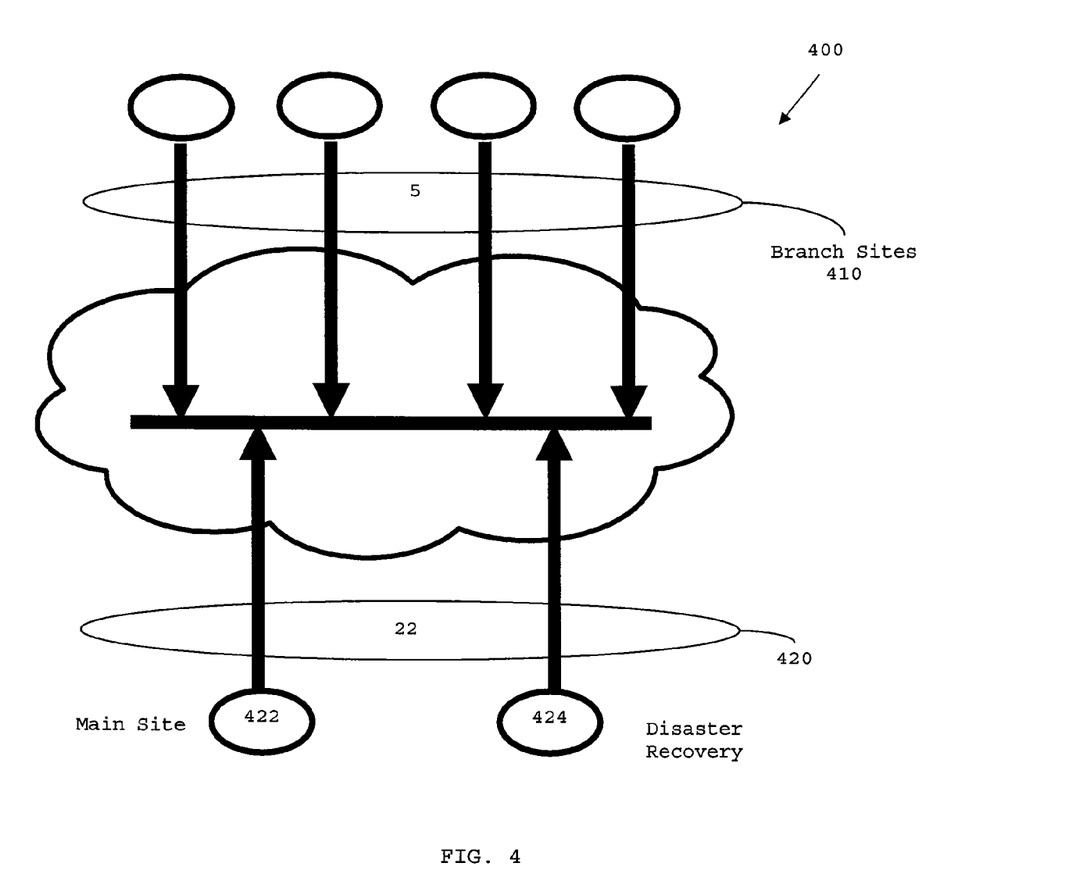
FIG. 4 illustrates an embodiment of an aggregate-rate service model according to the present invention.

In an embodiment of an aggregate-rate service model (400) as illustrated in FIG. 4, a customer deploys two aggregation-groups (410) and (420). Four branch sites in aggregation-group (410) share a guaranteed-rate 5 Mbps. A main site (422) and a disaster recovery site (424) share a guaranteed-rate 22 Mbps. This is a particularly useful application since main site (422) and disaster recovery site (424) do not use the guaranteed-rate at the same time.

Figure 5:
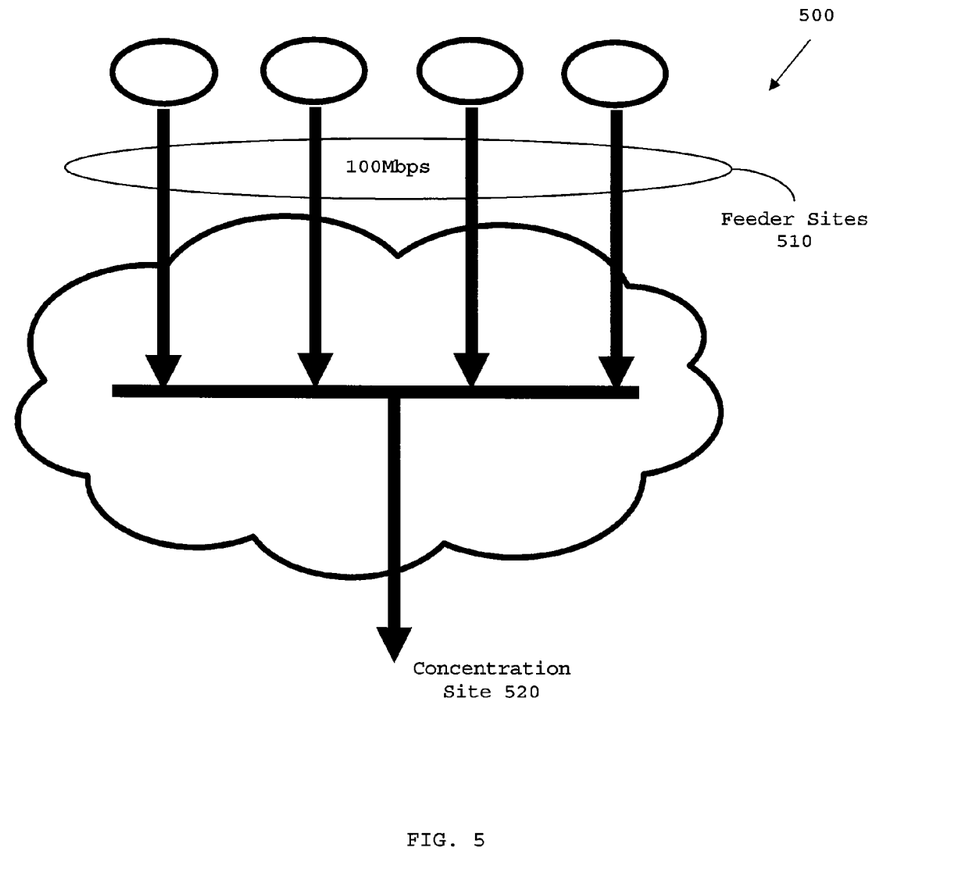
FIG. 5 illustrates an embodiment of an aggregate-rate service model according to the present invention.

As illustrated in FIG. 5, an embodiment of an aggregate-rate service model (500) is also suited to applications in which a customer, rather than a service provider, wishes to restrict aggregate traffic sent by a set of ports to a single port having limited capacity. This might be the case when a group of feeder sites (510), e.g. DSL Access Multiplexers (DSLAMs), sends traffic to a concentration site (520) with port capacity 100 Mbps, e.g. a Broadband Remote Access Server (BRAS). If aggregate traffic sent by DSLAMs (510) is greater than port capacity of BRAS (520), congestion may occur between DSLAMs (510) and BRAS (520). The congestion may be avoided by enforcing an aggregate-rate for DSLAMs (510) to equal to the port capacity of BRAS (520).

An aggregate-rate service model may allow a port to send traffic in excess of a guaranteed-rate. Such traffic is marked as "non-conformant", and may be discarded by an intermediate provider switching device, if it is determined that forwarding of the "non-conformant" traffic by the device may result in a failure to deliver "compliant" traffic. Sending of excess-rate traffic may be supported when a service provider network has capability of discarding non-compliant traffic.

Aggregate-rate service model(s) of the present invention may be provided to meet requirements of customers with intermittent or "bursty" traffic. There may be an environment where customers intermittently send large files to other customers, and where each such file is required to be transferred quickly (i.e., at a high data-rate). In such an environment, it is unlikely that many file transfers occur concurrently. Hence, a relatively small amount of bandwidth may meet the transfer requirements of a large number of intermittent senders in an aggregate-rate service model.

Rate management policies may be provided to specify the ways in which ports of an aggregation-group share the capacity of the aggregation-group, and ways to manage capacity requirement of each individual port in an aggregation-group. For example, ports associated with an aggregation-group may share the capacity of the aggregation-group equally or proportionally according to a weighting scheme, or the allowed-rate of one port may be set to a predefined value or restricted to a value that is greater than, or less than, a predefined value. Rate-control algorithms may be used to control individual rate and aggregate-rate of an aggregation-group according to the rate management policy.

For each aggregation-group, an aggregate-rate service may be characterized by a guaranteed-rate, G, an increase in aggregate-rate, B, permitted during each time interval T, and duration of the time interval, T. A service level agreement may be that the system providing an aggregate-rate service guarantees that, for each aggregation-group, either:

total ingress-rate, $\Sigma I_i$, is greater than or equal to G; or any port having an offered rate, $O_i$, greater than or equal to the current ingress-rate, $I_i$, may increase its ingress-rate by as much as B during the next time interval T.

An aggregation-group may be identified by a mnemonic character string (aggregation -group-name) or other simple identifier. In one embodiment, a port may create an aggregation -group that does not yet exist, delete an aggregation-group that has been previously created, become a member of an existing aggregation-group, or withdraw its membership in an existing aggregation-group by using a novel protocol known as the MRP Aggregation-group Registration Protocol (MARP). MARP utilizes the generic registration services of the existing IEEE 802.1ak Multiple Registration Protocol (MRP).

In one embodiment, an aggregation-group may be created when a MARP_AGRP_REG primitive is issued by a port. This activity is known as aggregation-group registration. The aggregation-group-name and control-information may be supplied as parameters of the MARP_AGRP_REG primitive. The control-information may be a Group Media Access Control (MAC) Address, a set of Individual MAC Addresses, and/or other information used by the port to perform the distribution of control-messages associated with the aggregation-group. A MARP_AGRP_DEREG primitive may be issued by a port to remove the aggregation-group. This operation is known as aggregation-group deregistration. The aggregation-group-name may be supplied as a parameter of the MARP_AGRP_DEREG primitive.

In one embodiment, a port seeking membership in an aggregation-group may issue a MARP_AGRP_JOIN primitive with the aggregation-group-name as a parameter. MARP distributes the control-information associated with that aggregation-group to all members of the aggregation-group. Thus, the control-information is provided once, at the time of the MARP_AGRP_REG, and is not repeated when each MARP_AGRP_JOIN is issued. The control-information may contain one or more MAC addresses having twelve hexadecimal digits. By specifying the control-information once, at the time of aggregation-group creation, the need to specify such addresses identically, for each issued MARP_AGRP_JOIN, is eliminated. This is a benefit as repeated specification of such information is prone to human error. A port wishing to withdraw from an aggregation-group, may issue a MARP_AGRP_LEAVE primitive specifying the aggregation-group-name as a parameter.

Customers often monitor performance of network services for which they contract. In many cases, a service provider itself provides the monitoring service. Monitoring is done both to verify that services are adequate and appropriate for customer traffic, and to validate that the level of service provided is that which is contracted. An aggregate-rate control may be based on an idea that nearly real-time control may be performed in the presence of a quantifiable delay. Aggregate-rate control may be performed distinctly at each ingress port, accommodation for delay is incumbent in most rate-control methods.

In the case of monitoring, however, data analysis and reporting are timely, but need not be provided in real-time, as in the case of rate-control. One monitoring method may be based on use of a clock synchronization protocol, so that each port may identify time periods occurring concurrently at each port, with a known deviation. Results may then be reported distinctly by each port for a given time period, and data associated with the time periods correlated by a centralized monitoring application.

Data, together with a timestamp identifying the time period, is reported periodically by each port to a server. The data may include $O_{local}$, $A_{local}$, and $I_{local}$. These values may be averaged over the time period, reported for each time-interval T, or reported for selected time-intervals. The server may validate service parameters, by verifying that one of the following conditions is met during the time period:

$\Sigma I_i \geq G$ ; or $I_{(i,t)} - I_{(i,t-1)} \geq B$ or $O_i \leq A_i$ for every port $i$ in an aggregation-group.

The server may further determine the fraction of time periods in which the service parameters have been honored, allowing customers to request rebates when the percentage of time in which the service parameters have been honored is less than that in a SLA between a Service Provider and customers.

A server may further provide tables and graphical displays of the service parameter values, allowing customers to determine when higher or lower levels of service should be purchased.

The aggregate-rate service model provided in the present invention has many advantages compared with conventional models. For example, a conventional Resilient Packet Ring (RPR) method requires that Service Instance endpoints be associated with a physical ring topology in order to fairly share ring capacity. Furthermore, there is no method to commit capacity per Service Instance. Comparatively, the present invention allows a service provider network of an arbitrary topology to support multiple Service Instances such that each Service Instance is associated with a specified aggregate-rate value.

Ethernet Virtual Private Line service method and Ethernet Virtual Local Area network (LAN) service method require provisioning of rates associated with each pair of communicating Service Instance endpoints. However, the present invention provides a single guaranteed-rate value to be provisioned for each aggregation-group.

Table 1 provides a comparison between a service based on a conventional point-to-point service model and a service based on the aggregate-rate service model in the present invention.

TABLE 1

| Point-to-point service model (prior art) | Aggregate-rate service model |
| --- | --- |
| Customer specifies peak capacity required between each pair of communicating sites. | Customer specifies a single aggregate-rate for a service. |
| Committed capacity between two sites used only five minutes per day may not be used by other communicating sites at other times. | Committed aggregate-rate is fairly shared by any sites communicating at a particular time. |
| Large design and maintenance expense for a customer who must specify many individual capacity commitments and insure their adequacy over time. | Reduced design and maintenance expense for a customer who need only specify an aggregate-rate and insure the adequacy of that single capacity over time. |
| Large operational expense for a service provider who must provision and maintain a large number of individual capacity commitments. | Allows a provider to deploy a service that requires some added capacity commitment but significantly reduces operating expenses. |

The aggregate-rate service model of the present invention may be equally applied in an enterprise LAN environment. For instance, a building LAN may have several aggregation-groups, and each gets a specific share of network capacity. Within each aggregation-group, the capacity is shared fairly.

The aggregate-rate service model of the present invention may also be applied to any communications service that may be characterized as having multiple points of ingress, each of which has a measurable ingress rate. This may explicitly include a Metropolitan Ethernet (MEN) as defined by the Metropolitan Ethernet Forum (MEF), a Provider Bridged Network (PBN) or a Provider Backbone Bridged Network (PBBN) as defined by IEEE 802.1, and an Internet Protocol (IP) Virtual Private Network (VPN), as described by Internet Engineering Task Force (IETF) IP Request for Comment (RFC) 2547.

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system providing aggregate-rate services, comprising:
a provider network, having an arbitrary topology;
a plurality of customers; and
a plurality of port nodes, comprising at least one aggregation-group,
wherein each of the plurality of customers is associated with at least one of the plurality of port nodes to access the provider network,
wherein the at least one aggregation-group guarantees an aggregate-rate,
wherein port nodes in the at least one aggregation-group share capacity of the at least one aggregation-group fairly,
wherein a service level agreement is provided,
wherein the service level agreement provides that any port, in the at least one aggregation-group, having an offered rate, $O_i$, greater than or equal to the current ingress-rate, $I_i$, may increase its ingress-rate by as much as B during a next time interval, T, and
wherein the at least one aggregation-group is created by a port node issuing a MARP_AGRP_REG primitive,
wherein B is a minimum amount by which a value of an allowed rate, $A_i$, for the next time interval should exceed the current value of $I_i$ when ramping of allowed-rates is performed, and
wherein $I_i$ is the actual rate of traffic introduced by port i of an aggregation-group.

2. The system for providing aggregate-rate services in claim 1, wherein the provider network comprises an Ethernet network.

3. The system for providing aggregate-rate services in claim 1, wherein the provider network comprises a network having multiple points of ingress, each with a measurable ingress rate.

4. The system for providing aggregate-rate services in claim 1, wherein the provider network comprises a provider bridged network.

5. The system for providing aggregate-rate services in claim 1, wherein the provider network comprises a provider backbone bridged network.

6. The system for providing aggregate-rate services in claim 1, wherein the provider network comprises an Internet Protocol virtual private network.

7. The system for providing aggregate-rate services in claim 1, further comprising an enterprise local area network.

8. The system for providing aggregate-rate services in claim 1, wherein the guaranteed-rate has an arbitrary value.

9. The system for providing aggregate-rate services in claim 1, wherein port nodes in the at least one aggregation-group is allowed to send traffic in excess of the guaranteed-rate of the at least one aggregation-group.

10. The system for providing aggregate-rate services in claim 1, wherein the at least one aggregation-group is associated with at least one of the plurality of customers.

11. The system for providing aggregate-rate services in claim 1, wherein at least one of the plurality of customers is associated with at least one of the plurality of port nodes that does not belong to the at least one aggregation-group.

12. The system for providing aggregate-rate services in claim 1, wherein at least one method is provided to control aggregate-rate of the at least one aggregation-group.

13. The system for providing aggregate-rate services in claim 1, wherein the at least one aggregation-group is identified by a mnemonic character string.

14. The system for providing aggregate-rate services in claim 13, wherein the mnemonic character string is an aggregation-group-name.

15. The system for providing aggregate-rate services in claim 1, wherein the MARP_AGRP_REG primitive is issued using an MRP Aggregation-group Registration Protocol (MARP), and the MRP being Multiple Registration Protocol.

16. The system for providing aggregate-rate services in claim 1, wherein the MARP_AGRP_REG primitive comprises an aggregation-group-name and control-information.

17. The system for providing aggregate-rate services in claim 16, wherein the control-information comprises a group media access control address.

18. The system for providing aggregate-rate services in claim 16, wherein the control-information comprises a set of individual media access control addresses.

19. The system for providing aggregate-rate services in claim 16, wherein the control-information comprises information used by the port node to perform distribution of control-messages associated with the at least one aggregation-group.

20. The system for providing aggregate-rate services in claim 1, wherein the at least one aggregation-group is deleted by a port node issuing a MARP_AGRP_DEREG primitive.

21. The system for providing aggregate-rate services in claim 20, wherein the MARP_AGRP_DEREG primitive is issued through a MARP.

22. The system for providing aggregate-rate services in claim 1, wherein the plurality of port nodes join the at least one aggregation-group by issuing a MARP_AGRP_JOIN primitive.

23. The system for providing aggregate-rate services in claim 22, wherein the MARP_AGRP_JOIN primitive is issued through a MARP.

24. The system for providing aggregate-rate services in claim 22, wherein the MARP_AGRP_JOIN primitive comprises an aggregation-group-name.

25. The system for providing aggregate-rate services in claim 1, wherein a port node withdraws from the at least one aggregation-group by issuing a MARP_AGRP_LEAVE primitive.

26. The system for providing aggregate-rate services in claim 25, wherein the MARP_AGRP_LEAVE primitive is issued through a MARP.

27. The system for providing aggregate-rate services in claim 25, wherein the MARP_AGRP_LEAVE primitive comprises an aggregation-group-name.

28. A system providing aggregate-rate services, comprising:
a provider network, having an arbitrary topology;
a plurality of customers; and
a plurality of port nodes, comprising at least one aggregation-group,
wherein each of the plurality of customers is associated with at least one of the plurality of port nodes to access the provider network,
wherein the at least one aggregation-group guarantees an aggregate-rate, wherein port nodes in the at least one aggregation-group share capacity of the at least one aggregation-group fairly, wherein a performance monitor is provided for the aggregate-rate services, wherein the performance monitor is provided using a clock synchronization protocol, wherein monitoring results are reported to a server, and wherein the server verifies that $I_{(i,t)} - I_{(i,t-1)} \geq B$ for each port i in the at least one aggregation-group, wherein $I_{(i,t)}$ is the actual rate of traffic introduced by port i of an aggregation-group at, a current time, t, wherein $I_{(i,t-1)}$ is the actual rate of traffic introduced by port i of an aggregation-group at a previous time, t−1, and wherein B is a minimum amount by which a value of an allowed rate, $A_i$, for the next time interval should exceed the current value of when ramping of allowed-rates is performed.

29. The system for providing aggregate-rate services in claim 28, wherein the performance monitor is performed by each of the plurality of port nodes.

30. The system for providing aggregate-rate services in claim 28, wherein the monitoring results comprise data and timestamp.

31. The system for providing aggregate-rate services in claim 30, wherein the data comprises $O_{local}$, $A_{local}$, and $I_{local}$.

32. The system for providing aggregate-rate services in claim 31, wherein the server verifies that $\Sigma I_i > G$.

33. The system for providing aggregate-rate services in claim 31, wherein the server verifies that $O_i \leq A_i$ for every port i in the at least one aggregation-group.

34. The system for providing aggregate-rate services in claim 28, wherein the monitoring results are reported for a given time period.

35. The system for providing aggregate-rate services in claim 28, wherein the monitoring results are reported for selected time periods.

36. The system for providing aggregate-rate services in claim 28, wherein the server evaluates whether the aggregate-rate services provided meet a Service Level Agreement (SLA).

37. The system for providing aggregate-rate services in claim 28, wherein the server provides tables and graphical displays of parameter values of the aggregate-rate services.

38. The system for providing aggregate-rate services in claim 1, wherein the service level agreement provides that total ingress-rate, $\Sigma I_i$, of the at least one aggregation-group is greater than or equal to G.

* * * * *

UNITED STATES PATENT AND TRADEMARK OFFICE
CERTIFICATE OF CORRECTION

PATENT NO. : 7,881,192 B2
APPLICATION NO. : 11/622536
DATED : February 1, 2011
INVENTOR(S) : Robert Sultan et al.

It is certified that error appears in the above-identified patent and that said Letters Patent is hereby corrected as shown below:

Claim 28 should read:

28. A system providing aggregate-rate services, comprising:
a provider network, having an arbitrary topology;
a plurality of customers; and
a plurality of port nodes, comprising at least one aggregation-group,
  wherein each of the plurality of customers is associated with at least one of the plurality of port nodes to access the provider network,
  wherein the at least one aggregation-group guarantees an aggregate-rate,
  wherein port nodes in the at least one aggregation-group share capacity of the at least one aggregation-group fairly,
  wherein a performance monitor is provided for the aggregate-rate services,
  wherein the performance monitor is provided using a clock synchronization protocol,
  wherein monitoring results are reported to a server, and
  wherein the server verifies that $I(i,t) - I(i,t-1) \geq B$ for each port i in the at least one aggregation-group,
  wherein $I(i,t)$ is the actual rate of traffic introduced by port i of an aggregation-group at a current time, t,
  wherein $I(i,t-1)$ is the actual rate of traffic introduced by port i of an aggregation-group at a previous time, t-1, and
  wherein B is a minimum amount by which a value of an allowed rate, $A_i$, for the next time interval should exceed the current value of $I_i$ when ramping of allowed-rates is performed.

Claim 32 should read:

32. The system for providing aggregate-rate services in claim 34, wherein the server verifies that $\sum I_i \geq G$.

Signed and Sealed this
Fifteenth Day of March, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,881,192 B2 | |
| APPLICATION NO. | : 11/622536 | |
| DATED | : February 1, 2011 | |
| INVENTOR(S) | : Robert Sultan et al. | |

It is certified that error appears in the above-identified patent and that said Letters Patent is hereby corrected as shown below:

Column 10, line 55 - Column 11, line 15,
Claim 28 should read:

28. A system providing aggregate-rate services, comprising:
a provider network, having an arbitrary topology;
a plurality of customers; and
a plurality of port nodes, comprising at least one aggregation-group,
   wherein each of the plurality of customers is associated with at least one of the plurality of port nodes to access the provider network,
   wherein the at least one aggregation-group guarantees an aggregate-rate,
   wherein port nodes in the at least one aggregation-group share capacity of the at least one aggregation-group fairly,
   wherein a performance monitor is provided for the aggregate-rate services,
   wherein the performance monitor is provided using a clock synchronization protocol,
   wherein monitoring results are reported to a server, and
   wherein the server verifies that $I(i,t) - I(i,t-1) \geq B$ for each port i in the at least one aggregation-group,
   wherein $I(i,t)$ is the actual rate of traffic introduced by port i of an aggregation-group at a current time, t,
   wherein $I(i,t-1)$ is the actual rate of traffic introduced by port i of an aggregation-group at a previous time, t-1, and
   wherein B is a minimum amount by which a value of an allowed rate, Ai, for the next time interval should exceed the current value of Ii when ramping of allowed-rates is performed.

This certificate supersedes the Certificate of Correction issued March 15, 2011.

Signed and Sealed this
Twenty-sixth Day of April, 2011

David J. Kappos
*Director of the United States Patent and Trademark Office*

Column 12, lines 1-12,
Claim 32 should read:

32. The system for providing aggregate-rate services in claim 34, wherein the server verifies that $\sum I_i \geq G$.